(12) United States Patent
Gergely et al.

(10) Patent No.: US 6,505,648 B1
(45) Date of Patent: Jan. 14, 2003

(54) LIQUID TREATMENT BY CAVITATION

(75) Inventors: Stephen Gergely, Coventry (GB); Peter White, Coventry (GB)

(73) Assignee: Coventry University, Coventry (GB)

( * ) Notice: Subject to any disclaimer, the term of this patent is extended or adjusted under 35 U.S.C. 154(b) by 0 days.

(21) Appl. No.: 09/762,122

(22) PCT Filed: Aug. 4, 1998

(86) PCT No.: PCT/GB98/02339
§ 371 (c)(1),
(2), (4) Date: Apr. 12, 2001

(87) PCT Pub. No.: WO00/07941
PCT Pub. Date: Feb. 17, 2000

(51) Int. Cl.$^7$ .................................................. F15C 1/04
(52) U.S. Cl. ...................... 137/828; 137/827; 137/833; 137/842; 138/44
(58) Field of Search ................... 137/334, 828, 137/827, 833, 842; 138/44

(56) References Cited

U.S. PATENT DOCUMENTS 3,760,848 A * 9/1973 Rehsteiner .................. 137/828
4,949,742 A * 8/1990 Rando et al. .................. 137/13
5,111,847 A * 5/1992 Hu et al. ..................... 137/828

* cited by examiner

Primary Examiner—A. Michael Chambers
(74) Attorney, Agent, or Firm—Paul Y. Feng; Fulwider Patton Lee & Utecht, LLP

(57) ABSTRACT

A device (10) for treating a continuously moving liquid has a liquid inlet (12) and a liquid outlet (14) at opposite ends of a generally annular passage (16). The passage has a restriction (18) which is generally cylindrical and which, at its outlet (22) is formed with an annular shoulder (24) which provides an abrupt change in the diameter of the passage. An obstruction (26) in the form of a wire extends across the restriction (18) adjacent the outlet (22). The restriction (18) serves to increase the speed of liquid flowing through the passage, thus reducing the liquid pressure. The obstruction (26) also assists in reducing the liquid pressure. The device reduces the liquid pressure below a level at which cavitation occurs in order to induce cavitation.

13 Claims, 1 Drawing Sheet

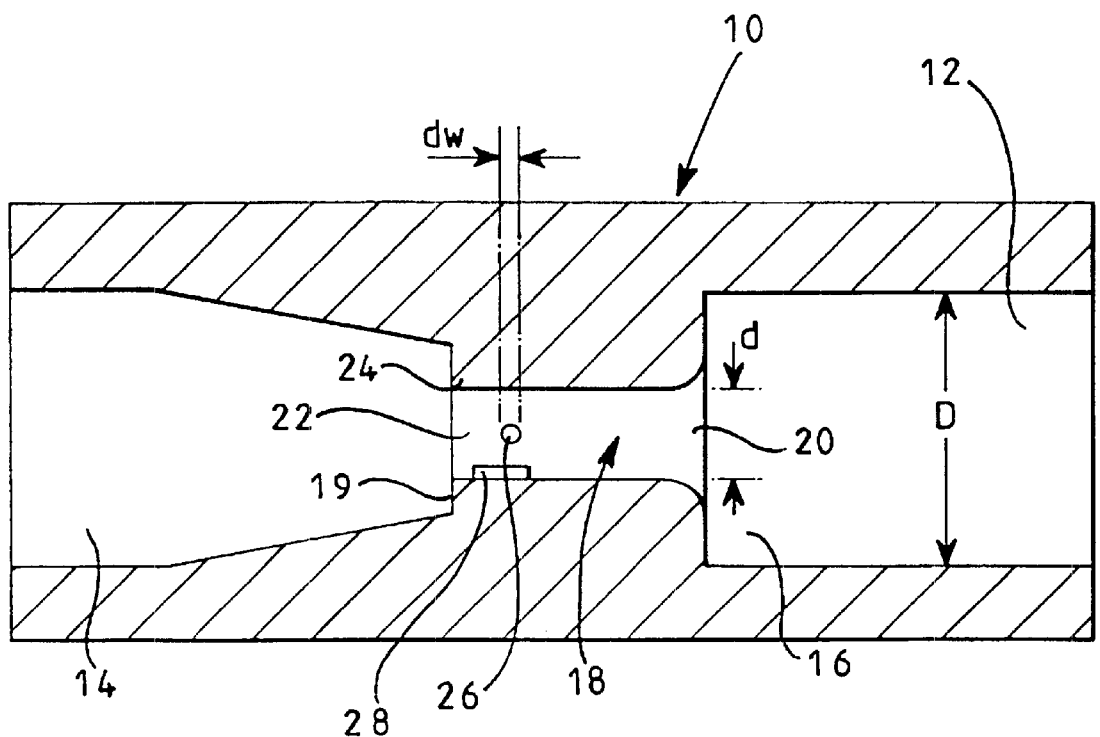

LIQUID TREATMENT BY CAVITATION

The present invention relates to the treatment of a liquid.

There are many instances where a liquid needs treatment to remove dissolved gases or destroy contaminating organisms. Hitherto, the former has in the main been effected solely by the use of ultrasound on static liquids, which is expensive and therefore has a limited use, whilst the latter has required large scale plant with treatment by chemical agents.

Accordingly, the present invention provides a device for treating a continuously moving liquid, the device comprising:

a liquid inlet;

a liquid outlet;

and liquid passage means interconnecting said inlet and said outlet;

wherein said passage means has means to reduce the liquid pressure below a desired level.

The present invention is further described hereinafter, by way of example, with reference to the accompanying drawing, which is a cross-sectional view of a preferred form of the invention.

Referring to the drawing, this shows a device 10 for inducing cavitation in a continuously flowing liquid. The device is generally cylindrical in cross-section although any suitable cross-sectional shape can be used. It has a liquid inlet 12 and a liquid outlet 14 which are conveniently axially aligned, although this is not essential, and are interconnected by a passageway 16. The inlet 12, outlet 14 and passageway 16 are generally circular in crosssection although again any suitable cross-sectional shape may be used.

Between the inlet and outlet 12, 14 the passageway 16 is formed with a restriction 18 in the form of a reduced diameter portion of the passageway 16. The restriction 18 is generally tubular having an inlet 20 and an outlet 22. The outlet 22 is formed with an annular shoulder 24 which provides an abrupt change in the diameter of the passageway 16. The passageway 16 then tapers outwardly from this shoulder 24 towards the liquid outlet 14 to provide a more gradual enlargement of the passageway 16. Whilst the annular shoulder 24 is shown as being a right angle in cross section, it will be appreciated that the angle formed between the wall of the restriction 18 and the adjoining wall 19 of the shoulder 24 may be greater than 90°. In addition, the shoulder may be curved with a small radius of curvature provided its effect on the liquid flow is as described below.

An obstruction 26, preferably elongate in the form of a rod or wire extends part way or fully across the restriction 18. The rod or wire is conveniently of circular cross-section and extends across a diameter of the restriction 18, although any suitably shaped obstruction can be used in any suitable position in the restriction 18. The obstruction 26 is conveniently positioned near, at or adjacent the outlet 22 of the restriction 18. The obstruction 26 is a preferred feature and is not essential although it does assist in inducing cavitation in the liquid.

In use, the continuously flowing liquid passes through the passageway 16 and the restriction 18, flowing from the inlet 12 through to the outlet 14. The restriction 18 acts as a nozzle to accelerate the flow of liquid through the restriction 18, as a result of which the liquid pressure in the restriction 18 drops relative to the liquid pressure in the passageway 16 adjacent the inlet 12. The obstruction 26 causes turbulence in the liquid flow downstream of the restriction, further lowering the liquid pressure. This reduced liquid pressure can be used to achieve several ends.

If the liquid contains a dissolved gas then the lowering of the liquid pressure below a desired or selected level results in the gas coming out of solution. The resulting gas which has been forced from the liquid can be collected in a suitable chamber downstream of the outlet 14.

Where the liquid pressure is less than the vapour pressure of the liquid cavitation is initiated in the liquid. With the obstruction 26 present, this would normally be induced downstream of the obstruction 26.

The diameter D of the passageway 16 upstream of the restriction 18, the diameter d of the restriction 18 and the diameter $d_w$ of the wire 26 can be varied and are chosen in relation to the liquid such that the liquid pressure created downstream of the obstruction 26 is less than the vapour pressure of the liquid to cause cavitation in the liquid downstream of the obstruction 26.

The abrupt widening of the passageway 16 downstream of the restriction 18 then results in a rapid increase in the liquid pressure which collapses the cavitation.

It is also possible to promote cavitation in the above-described device using ultra sound. This can be used in place of or in addition to the obstruction 26. Whether or not the obstruction 26 is used, the diameter D of the passageway 16 upstream of the restriction 18, the diameter d of the restriction 18 and the diameter $d_w$ of the wire 26 (where provided) are chosen in relation to the liquid such that the liquid velocity is increased in order to reduce the internal liquid pressure to a point just above that required for the onset of cavitation. This region of the liquid is then subjected to ultrasound of sufficient energy to create cavitation.

Ultrasound may be generated electrically by means of an ultrasound generator 28 which is shown conveniently positioned in the restriction 18 to provide the maximum ultrasound energy at the location where the liquid pressure is at its lowest. Where the obstruction 26 is used then this will normally be at or adjacent the obstruction 26 and ideally downstream of the obstruction. In the absence of the obstruction 26 then the ultrasound generator 28 will be positioned to generate the maximum ultrasound energy at or adjacent the downstream end of the restriction 18. However, its position can, of course, be varied as required.

Although the ultrasound generator 28 is shown positioned in the restriction 18 it can of course be positioned in the passageway 16 outside the restriction 18, downstream of the restriction 18, if desired and may be directional in that the energy generated is directed primarily towards the location of low or lowest liquid pressure.

The ultrasound generator 28 is conveniently in the form of a piezoelectric generator or other electro-mechanical transducer. However, the ultrasound may alternatively be generated mechanically by means of a siren. The disk or paddle of the siren is again ideally positioned in the restriction 18 where the liquid pressure is at its lowest. This is usually adjacent the outlet 22. The disk or paddle is arranged co-axial with the restriction 18 and is either mechanically or electrically driven. It can conveniently be mechanically driven by a turbine or propellor or other suitable means positioned upstream or preferably downstream of the disk in the path of the liquid. The turbine or propellor is mechanically coupled to the disk and is rotatably driven by the flow of liquid to drive the disk and generate cavitation in the liquid flowing past the disk.

When an ultrasound generator is used in the device shown in the drawing, considerably less energy is required to induce cavitation than is normally required using ultrasound to induce cavitation in a static liquid.

The sudden collapse of the cavitation which occurs downstream of the restriction 18 also has the effect of destroying biological organisms in the liquid. It is believed that this occurs because the collapse in the cavitation causes sudden and very high local pressures to occur around the collapsing cavitation. These very high local pressures may disrupt the physical structure of the organisms, or cause the formation of short lived reactive chemical species such as OH*, H* and $H_2O_2$ which destroy the organisms through secondary oxidation. The above-described device therefore also has applications in the treatment of contaminated liquids.

The device 10 would normally be operated at the mean bulk liquid temperature although, where it is considered to be economic, the temperature of the liquid may be changed to enhance cavitation and/or promote the desired reactions.

One use of the device is in a syphoning system. Here, the device can be positioned in the syphoning system at the point where the liquid pressure is at its lowest (normally at the highest point in the syphon) as a result of which the liquid flow rate required to give rise to cavitation would be relatively low. Where the device is used in other than a syphoning system, a higher liquid flow rate may be needed to induce cavitation, resulting in the need for a pump.

What is claimed is:

1. A device (10) for treating a continuously moving liquid, the device (10) comprising:

a liquid inlet (12);

a liquid outlet (14);

and liquid passage means (16) interconnecting said inlet (12) and said outlet (14);

wherein said passage means (16) has:

means (18) to reduce the liquid pressure below a desired level comprising a restriction (18) in said passage means (16) for accelerating the flow of liquid through the restriction (18) thereby to reduce the liquid pressure;

and means (28) for generating ultrasound energy in the reduced pressure liquid thereby to induce cavitation in said liquid.

2. A device (10) as claimed in claim 1 wherein said means (18) to reduce the liquid pressure below a desired level is operable to increase the liquid velocity in order to reduce the internal liquid pressure to a point just above that required for the onset of cavitation.

3. A device as claimed in claim 1 wherein:

said restriction has a diameter d and said passage means upstream of the restriction has a diameter D;

and said diameters D and d are chosen in relation to the liquid such that the liquid velocity is increased in order to reduce the internal liquid pressure to a point just above that required for the onset of cavitation.

4. A device as claimed in claim 3 wherein said means to reduce the liquid pressure includes an obstruction in said restriction for causing turbulence in the liquid flow thereby further to lower the liquid pressure.

5. A device as claimed in claim 4 wherein:

said obstruction has a diameter $d_w$;

and said diameters D, d and $d_w$ are chosen in relation to the liquid such that the liquid velocity is increased in order to reduce the internal liquid pressure to a point just above that required for the onset of cavitation.

6. A device as claimed in claim 4 wherein said obstruction is formed by an elongate member extending at least part way across the restriction.

7. A device as claimed in claim 4 wherein said obstruction is positioned at or adjacent the restriction outlet.

8. A device as claimed in claim 1 wherein said restriction comprises a longitudinal portion of said passage means having a reduced cross-section, a liquid inlet and a liquid outlet.

9. A device (10) as claimed in claim 4 wherein said liquid outlet (22) of said restriction (18) is formed with a shoulder (24) providing an abrupt change in the cross-sectional area of the passage means (16).

10. A device as claimed in claim 1 wherein said means to reduce the liquid pressure comprises generator means for generating ultrasonic energy in said passage means.

11. A device (10) as claimed in claim 10 wherein said ultrasound generator is located in said restriction (18).

12. A device as claimed in claim 10 wherein said ultrasound generator is an electro-mechanical transducer.

13. A device as claimed in claim 1 further comprising heating means for heating liquid flowing through the device.

* * * * *